G. B. FRANKFORTER.
PROCESS OF EXTRACTING TURPENTINE AND RESINOUS MATTER FROM WOOD.
APPLICATION FILED JULY 13, 1906.
918,990.
Patented Apr. 20, 1909.
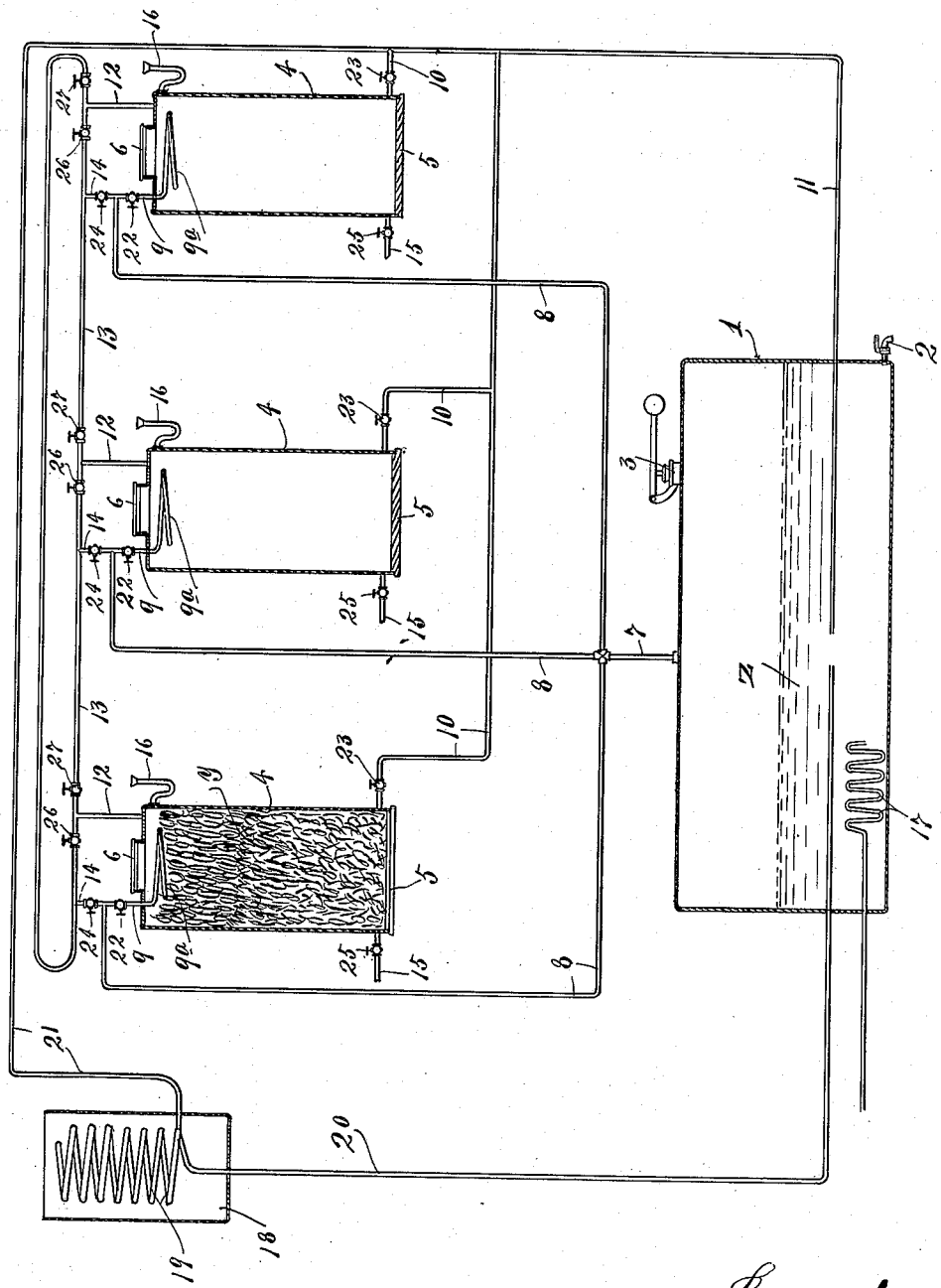
Witnesses
A. H. Opsahl
E. W. Jeppesen.
Inventor.
G. B. Frankforter
By his Attorneys.
Williamson & Mucklow

UNITED STATES PATENT OFFICE.

GEORGE B. FRANKFORTER, OF MINNEAPOLIS, MINNESOTA.

PROCESS OF EXTRACTING TURPENTINE AND RESINOUS MATTER FROM WOOD.

No. 918,990.           Specification of Letters Patent.           Patented April 20, 1909.

Application filed July 13, 1906. Serial No. 326,085.

*To all whom it may concern:*

Be it known that I, GEORGE B. FRANKFORTER, a citizen of the United States, residing at Minneapolis, in the county of Hennepin and State of Minnesota, have invented certain new and useful Improvements in Processes of Extracting Turpentine and Resinous Matter from Wood; and I do hereby declare the following to be a full, clear, and exact description of the invention, such as will enable others skilled in the art to which is appertains to make and use the same.

My invention has for its object to provide an improved process of extracting turpentine and resinous matter from resinous wood, and to this end it consists of the novel treatment and sequential steps of treatment hereinafter set forth and defined in the claim.

In carrying out this improved process, the wood is preferably first cut into small particles and may be in the form of saw-dust, shavings, "excelsior", or chips. The wood may be cheaply and practically reduced to chip form by running the same through what is known in saw mill parlance as a "hog".

The wood to be treated by the process is placed within a suitable containing vessel, hereinafter designated in the description of the apparatus as an "extraction chamber", and it is subjected to the action of one of the carbon compounds, such as ether, petroleum ether, or carbon disulfid, which has the property of dissolving and holding in solution the turpentine and resinous matter of the resinous wood.

The solvent liquid charged with turpentine and resinous matter held in solution thereby, is drawn off from the wood into a suitable containing vessel hereinafter designated in the description of the apparatus as a boiler, and by a low boiling temperature, insufficient to boil the turpentine and resinous matter, the solvent liquid is vaporized and is returned to the extraction chamber, while the turpentine and resinous matter are deposited in the boiler, from which boiler said turpentine and resinous matter may be drawn off from time to time.

After the turpentine and resinous matter have been extracted from the wood and carried from the extraction chamber by the solvent fluid, a very considerable amount of solvent fluid will remain in said extraction chamber; and in order to reclaim and save such portion of the solvent fluid, I introduce into said extraction chamber a so-called "reclaiming fluid". This reclaiming fluid must have a density which is different from that of the solvent fluid, and it must be of such nature that it will not permanently commingle therewith. To secure the best results, the said reclaiming fluid should be one whose density at the temperature at which reclamation or separation takes place, is greater than that of the solvent fluid, so that the latter will be caused to rise to the top of the extraction chamber and may be caused to pass out of an opening in the upper portion of said extraction chamber. To illustrate more clearly, suppose that petroleum ether, whose specific gravity is .67 and whose boiling point is about 55 degrees C., is used as a solvent fluid, and that water at a temperature above the boiling temperature of said solvent fluid is used as a reclaiming fluid. Under the treatment just described, the solvent fluid is converted into vapor and, hence, is caused to free itself from the wood particles, so that it may rise in the extraction chamber above the reclaiming fluid. Again, suppose that carbon disulfid, whose gravity is 1.29, and whose boiling point is about 47 degrees Cent., is used as a solvent liquid, and that hot water is used as a reclaiming fluid. In this instance the solvent fluid is of greater density than the reclaiming fluid at temperatures below 47 degrees Cent., but above 47 degrees Cent. the said solvent fluid, to-wit, the carbon disulfid, will be vaporized and the density of this vaporized carbon disulfid is less than that of the reclaiming fluid (the water), and as is evident, in this instance, the reclamation or separation of the solvent fluid from the reclaiming fluid takes place at or above the boiling temperature of the said solvent liquid, to-wit, the carbon disulfid.

When water is used as a reclaiming fluid, the wood from which the turpentine and resinous matter is extracted will remain intact and no material change will take place in the structure of the wood fiber.

The process above described, while independent of apparatus may, nevertheless, be economically carried out on a commercial scale by means of an improved apparatus disclosed and claimed in a companion application filed by me of date July 13, 1906, Serial No. 326,084, entitled "Apparatus for use in extracting turpentine and resinous matter from resinous wood". The said apparatus is herein illustrated and described for the purpose of illustrating more clearly the manner in which the improved process herein claimed may be economically carried out on a large scale.

The said apparatus is illustrated in the single view of the drawing.

Referring to the drawing, the numeral 1 indicates a large tank preferably horizontally disposed and constructed of steel, and which, on account of one of the functions which it performs, and for the sake of definiteness in the description of the apparatus, I designate as a boiler. This boiler 1, as shown, is provided at or near its bottom with a draw-off cock or faucet 2, and at its top is provided with a safety valve 3 of the usual or any suitable construction.

Located above the boiler 1 is a plurality of so-called "extraction chambers" which are adapted to contain the wood or resin containing material. As shown, these extraction chambers 4 are in the form of upright metal drums and they are provided with detachable bottoms 5 and removable upper end caps 6, which parts 5 and 6 may be detachably secured by means of threaded engagement, or by any other of the well known means for detachably securing such parts.

Vapor delivery pipes 7, 8 and 9 connect the upper portion of the boiler 1 with the upper portions of the several extraction chambers 4. The pipes 9 terminate, within the respective extraction chambers, in annular perforated spraying coils 9ª. Return pipes 10 and 11 connect the lower or bottom portions of the several extraction chambers 4 with the lower portion of the boiler 1. Outlet pipes 12 lead upward from the top of the several extraction chambers 4 and these outlet pipes 12 are connected by an endless pipe 13. In the drawing, the several extraction chambers 4 are shown as located in a row, but in practice they might be placed in circular arrangement and, of course, any desired number of the said extraction chambers may be employed. The short pipe sections 14, as shown, connect the endless pipe 13 to the several pipes 9. Pipes 15 open into the lower portions of the several extraction chambers 4, for a purpose which will hereinafter appear. Bent tubes 16 open to the atmosphere in the upper portions of the several extraction chambers 4. These tubes, when partly filled with water or other heavy liquid, constitute water traps or seals that are normally closed.

As a means for heating the contents of the boiler 1, a closed steam conveying coil leads from a suitable source of steam supply 17 and extends along the inner lower portion of said boiler.

The numeral 18 indicates an elevated water-containing tank which is adapted to be supplied with cold water by any suitable connections, (not shown). Within this tank 18 is a condensing coil 19, and to the lower end of which, as shown, are connected two pipes 20 and 21. The pipe 20 leads downward and terminates in the lower portion of the boiler 1, while the pipe 21 is directly connected, as shown, to one of the pipes 10 and hence is indirectly connected to all of said pipes 10 and to the pipe 11. Any vapor delivered into the coil 19 from the pipe 21 will be condensed and will run back into the boiler 1, through the pipe 20.

For purposes which will hereinafter appear, the several pipes are provided with valves located as follows: Each pipe 9 is provided with a valve 22; each pipe 10 is provided with a valve 23; each pipe 14 is provided with a valve 24; each pipe 15 is provided with a valve 25; and the continuous pipe 13 is provided with valves 26 and 27. The valves 26 and 27 are located one at each side of each of the outlet pipes 12.

The wood in the form of chips, shavings, excelsior or saw-dust is, of course, placed in the respective extraction chambers, while the tops 6 thereof are removed and while the bottoms 5 thereof are secured in position. The preferred manner for carrying out the improved process by means of the apparatus above described is as follows: One of the extraction chambers 4, let us assume the one at the left as shown in the drawing, is first filled with the wood particles and the boiler 1 is partly filled with the solvent liquid, which we will assume to be petroleum ether which is a low boiling hydro carbon compound having the property of dissolving and holding in solution turpentine and resinous matter. We will now assume that all of the valves 24, 25, 26 and 27 are closed, that the valves 22 and 23 of the said first extraction chamber at the left are opened, and that all other of the valves 22 and 23 are closed. We will now assume that the solvent fluid $z$ in the boiler 1 is heated to a temperature sufficient to vaporize the said solvent liquid which, if the same be petroleum ether, requires a temperature above 55 degrees C. The solvent vapor generated in the boiler 1 will pass upward through the pipe 7 and through the left hand pipes 8 and 9 and spraying coil 9ª, and will be discharged into the left hand extraction chamber 4 and directly upon the wood particles $y$ confined in said extraction chamber. The vaporized solvent fluid upon cooling will condense within the said extraction chamber 4 and will trickle down upon the wood particles and will dissolve and take into solution the turpentine and resinous matter thereof, and from said extraction chamber will flow back through the left hand pipe 10 and the return pipe 11 into the boiler 1. By the steam coil 17 or other suitable means, the temperature of the liquid within the boiler 1 is kept above the boiling temperature of the said solvent liquid, so that the said solvent liquid is continuously vaporized and caused to travel the course just described, through the extraction chamber noted and through the wood particles contained therein, and thence back to the boiler. The solvent liquid is revaporized by a temperature which is insufficient to vaporize either the turpentine or the resinous matter and, hence, the said turpentine and resinous matter is continuously deposited in the bottom of said boiler, from which boiler it may, from time to time, be drawn off through the faucet 2.

After the extraction of the turpentine and resinous matter from the wood contained in the said extraction chamber at the left, the valves 22, 23, 24 and 26 adjacent thereto, should be closed and the valves 25 and 27 adjacent thereto should be opened and also the valves 26 of the second or intermediate extraction chamber should be opened up. The opening of the valve 25 will permit the reclaiming fluid, which we will assume to be water, to run into and fill the said first or left hand extraction chamber, thereby forcing the lighter solvent fluid out of the said first extraction chamber and into the second or intermediate extraction chamber. In this way, the solvent fluid left in the first extraction chamber, after the extraction of turpentine and resinous matter from the wood has been completed, is not only reclaimed and saved, but is forced into the second extraction chamber. In practice, the so-called "second" or intermediate extraction chamber should be filled with the wood particles while the extraction of turpentine and resinous matter from the wood contained in the first extraction chamber is taking place.

The crooked tubes 16 which constitute a sealing device and which normally contain water or other liquid, are preferably made of glass, so that the operator can tell, by observing the upward movement of the liquid in said tube, when the extraction chamber has been filled with the water or other reclaiming fluid. After the first or left hand extraction chamber has been filled with the reclaiming liquid, and the solvent liquid has been forced out of the same, the valve 27 thereof should be closed to prevent the backward flow of the said solvent liquid. The said reclaiming liquid may be drawn off from the extraction chamber by any suitable device as, for instance, by allowing it to run backward through the pipe 15; or it may be removed from the said extraction chamber together with the wood particles, when the bottom 5 of the said chamber is removed.

The above arrangement, as is evident, makes it possible to continuously carry out the process of extracting the turpentine and resinous matter by always rendering available for use at least one of the extraction chambers.

Any of the solvent liquid which may be converted into vapor within any of the pipes 10 or 11 may rise through the pipe 21 into the open coil 19 where it will be condensed and from thence may run back to the boiler 1 through the pipe 20.

With the apparatus above described, it is possible to have two or more of the extraction chambers in action at one time. Before the faucet 2 is opened up to draw off the turpentine and resinous matter, it is advisable first to close the valves 23 in the return pipes and to open the valves 22 in the supply pipes 9, and by the application of heat to the contents of the boiler 1 to vaporize the solvent liquid and drive the same from the boiler into the extraction chambers.

What I claim is:

The process of extracting turpentine and resinous matter from resinous wood by means of a solvent fluid, and in reclaiming the solvent fluid after extraction has been completed, which consists in subjecting the wood to a solvent fluid and thereafter applying to said solvent fluid a reclaiming fluid in liquid condition but at a temperature above that of the boiling point of said solvent, whereby the said solvent is vaporized and removed from the wood and reclaiming fluid.

In testimony whereof I affix my signature in presence of two witnesses.

GEORGE B. FRANKFORTER.

Witnesses:
 MALIE HOEL,
 F. D. MERCHANT.